Patented June 18, 1940

2,205,194

UNITED STATES PATENT OFFICE 2,205,194

PROCESS OF DIFFERENTIAL FLOTATION OF MIXED SULPHIDE ORE

William D. Green, Bauer, Utah, assignor to Combined Metals Reduction Company, Bauer, Utah, a corporation of Utah No Drawing. Application April 24, 1939, Serial No. 269,814

5 Claims. (Cl. 209—167)

This invention relates to the treatment of mixed sulphide ores by differential flotation to effect the separation of the different sulphides thereof, and is particularly applicable to complex ores containing sulphides of lead, copper, zinc and iron. Different processes have been used with more or less success for separating the mixed sulphides of such ores by differential flotation. The usual practice of differential flotation is to treat the ore pulp, prepared as for simple flotation, with a reagent which will permit flotation of the sulphide of one metal (usually lead) but will prevent or minimize flotation of the other sulphides. This produces a concentrate of the first metal which is removed, whereupon the residue is treated with one or more reagents that bring about flotation and concentration of the sulphide of a second metal while preventing or minimizing flotation of the remaining sulphides. The concentrate of the second metal is removed and the residue then remaining is similarly treated until the sulphides of all of the metals in the ore are separated and concentrated.

Heretofore the process, which has been most successful in the treatment of complex sulphide ores containing lead, copper, zinc and iron, such as those from Bingham, Utah, has been the so-called sulphite process, especially the sulphite process that is fully described in my patent therefor No. 1,721,993 dated July 23, 1929. This so-called sulphite process is characterized largely by the use of an immunizing sulphite and zinc sulphate in the ore pulp to depress the zinc sulphide. In actual practice with complex sulphide ores containing lead, zinc, iron and copper sulphides, such as those from Bingham, Utah, poor economy is had due to a substantial portion of the zinc sulphide floating with the lead sulphide concentrate even when a zinc sulphate or other known zinc depressant is used. Even in this so-called sulphite process, it is not uncommon, in the treatment of complex sulphide ores from Bingham, Utah, for the lead concentrate, or the lead and copper concentrate, or the copper concentrate to contain as much zinc sulphide as from twelve per cent to twenty per cent of such concentrate.

I have discovered that in the treatment of complex sulphide ores, especially those ores that contain copper sulphide as well as lead, zinc and iron sulphides, such as those from Bingham, Utah, the zinc sulphide can be substantially depressed and most of it kept out of the froths of the lead concentrate, the copper concentrate and the mixed lead and copper concentrate in their respective circuits, during selective froth flotation treatment of such complex ores, by the addition of aluminum sulphate or aluminum chloride to an ore pulp containing sulphite or by the addition of a sulphite to an ore pulp to which aluminum sulphate or aluminum chloride or both are added prior to or during the flotation treatment of said ore pulp. The effect of such addition of aluminum sulphate or aluminum chloride or of both is to liberate sulphur dioxide ($SO_2$) in the ore pulp; and the sulphur dioxide, in its nascent condition, is more effective as a reducing agent and as a zinc depressant in ore flotation pulps than any of the depressants generally used, particularly, a cyanide with zinc sulphate, a sulphite with zinc sulphate or a cyanide with aluminum sulphate.

According to my improvement, therefore, aluminum sulphate or aluminum chloride is added to an ore pulp containing a sulphite with or without zinc sulphate; or a sulphite is added to an ore pulp containing aluminum sulphate or aluminum chloride or both. Any alkaline sulphite, or alkaline earth sulphite, or metal sulphite can be used. The quantity of sulphite required varies with the ores being treated as in the present practice of the so-called sulphite flotation process in which a sulphite, with or without zinc sulphate, is used as a depressant for zinc and iron sulphides. The sulphites that are most commonly used are sodium sulphite ($Na_2SO_3$), sodium hyposulphite ($Na_2S_2O_3$) and calcium sulphite ($CaSO_3$) and the reactions of aluminum chloride and aluminum sulphate therewith are as follows:

(1) $4AlCl_3 + 6Na_2S_2O_3 + 6H_2O =$
$\qquad 4Al(OH)_3 + 3S_2 + 12NaCl + 6SO_2$ (2) $2AlCl_3 + 3Na_2SO_3 + 3H_2O =$
$\qquad 2Al(OH)_3 + 6NaCl + 3SO_2$ (3) $Al_2(SO_4)_3 + 3Na_2SO_3 + 3H_2O =$
$\qquad 2Al(OH)_3 + 3Na_2SO_4 + 3SO_2$ (4) $Al_2(SO_4)_3 + 3Na_2S_2O_3 + 3H_2O =$
$\qquad 2Al(OH)_3 + 3Na_2SO_4 + 3SO_2 + 3S$ (5) $Al_2(SO_4)_3 + 3CaSO_3 + 3H_2O =$
$\qquad 2Al(OH)_3 + 3CaSO_4 + 3SO_2$ (6) $2AlCl_3 + 3CaSO_3 + 3H_2O =$
$\qquad 2Al(OH)_3 + 3CaCl_2 + 3SO_2$ When other sulphites are used, similar reactions occur with liberation of sulphur dioxide ($SO_2$).

The required quantity of aluminum sulphate or aluminum chloride used alone or together, also varies with the ores being treated, but usually the addition of from one-half pound to two pounds of either aluminum sulphate or aluminum chloride or of a mixture of both per ton of ore in the pulp will give the desired result. In some instances the quantity required may be more than two pounds per ton of ore. In practice the quantity required to assist the action of the sulphite can be readily determined by watching the zinc sulphide disappear from the froth containing the lead or copper concentrate.

The following example illustrates the merit of my improvement in comparison with the former practice. In the regular course of business, a complex ore from Bingham, Utah, containing sulphides of lead, copper, zinc and iron was being treated by the so-called sulphide process of differential ore flotation which is fully described in my Patent No. 1,721,993. The ore pulp contained calcium sulphite as a zinc inhibitant and the lead concentrate produced thereby contained an average of fifteen percent of zinc. Without stopping the operation or making any other change, aluminum sulphate was added to the pulp at the rate of one pound per ton of ore with the result that the lead concentrate thereafter produced contained only three percent of zinc. The subsequent operations followed the old practice with very satisfactory results. Since then, it has been the actual mill practice to use aluminum sulphate in conjunction with the sulphite in regular mill work on Bingham ores.

What I claim is:

1. In the sulphite process of differential ore flotation, the improvement which consists in bringing about a reaction in the pulp between the sulphite of the pulp and an aluminum salt of the group consisting of aluminum chloride and aluminum sulphate to liberate sulphur dioxide and thereby depress the zinc sulphide.

2. In the process of differential flotation of mixed sulphide ores containing lead sulphide and zinc sulphide, the improvement which consists in bringing about a reaction, in the pulp containing said sulphides, between a sulphide and an aluminum salt of the group consisting of aluminum chloride and aluminum sulphate.

3. The improvement in the process of differential flotation of mixed sulphide ores containing lead, copper, zinc and iron, which consists in forming therefrom a pulp containing a sulphite and a quantity of aluminum salt amounting to from about one-half pound to about two pounds per ton of ore, said aluminum salt belonging to the group which consists of aluminum chloride and aluminum sulphate.

4. The improvement in the process of differential flotation of mixed sulphide ores containing lead, copper, zinc and iron, which consists in forming therefrom a pulp containing calcium sulphite and zinc sulphate and a quantity of aluminum salt amounting to from about one-half pound to about two pounds per ton of ore, said aluminum salt belonging to the group which consists of aluminum chloride and aluminum sulphate.

5. The improvement in the sulphite process of differential flotation of mixed sulphide ores containing lead, copper and zinc, which consists in forming a pulp containing a sulphite and adding thereto an aluminum salt of the group consisting of aluminum sulphate and aluminum chloride at the rate of from about one-half pound to about two pounds per ton of ore.

WILLIAM D. GREEN.

CERTIFICATE OF CORRECTION.

Patent No. 2,205,194. June 18, 1940.

WILLIAM D. GREEN.

It is hereby certified that error appears in the printed specification of the above numbered patent requiring correction as follows: Page 2, first column, line 16, and second column, line 7, claim 2, for "sulphide" read --sulphite--; and that the said Letters Patent should be read with this correction therein that the same may conform to the record of the case in the Patent Office.

Signed and sealed this 10th day of September, A. D. 1940.

(Seal)
Leslie Frazer,
Acting Commissioner of Patents.